United States Patent Office 3,013,993
Patented Dec. 19, 1961

3,013,993
STABLE SILOXY TITANIUM OXIDE ORGANO POLYMERS AND METHOD OF MAKING SAME
John B. Rust and Hideyo H. Takimoto, Los Angeles, Calif., assignors to Hughes Aircraft Company, Culver City, Calif., a corporation of Delaware
No Drawing. Filed June 30, 1959, Ser. No. 823,818
13 Claims. (Cl. 260—2)

The present invention relates to siloxy modified titanium polymers of enhanced thermal stability, and especially titanoxy polymers having organosubstituted siloxy side chains.

Titanium oxide polymers which have been prepared by the careful hydrolysis of titanium ortho esters to yield polymers of the form:

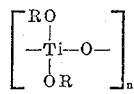

have been described. However, the RO groups on these polymers are easily subjected to further hydrolysis to yield cross-linked materials and finally the inorganic compound, titanium dioxide, itself. In fact, even during the careful hydrolysis cross-linked polymers are immediately produced because of the random nature of the process. Other disclosures have been made of the hydrolysis of mixed esters $(RO)_2Ti(OR')_2$ where R is a low boiling easily hydrolyzed alcohol group and R' is usually a very high molecular weight, more difficultly hydrolyzable alcohol group. Still other disclosures describe the hydrolysis of titanium chelate esters and acylates.

Accordingly, it is an important object of this invention to provide resinous organo siloxy titanium oxide polymers of controlled structure and improved thermal stability.

Another object of this invention is to provide a method for making titanium oxide polymers having organosubstituted siloxy side chains.

A further object of this invention is to provide a group of resinous compositions of controlled structure and molecular weight and reproducible thermal and mechanical properties.

The polymers of this invention may be prepared by several processes. In each case it is highly important that the intermediate products be synthesized unequivocally and purified carefully prior to polymerization. The triorganosubstituted siloxy titanium intermediates used to produce the compositions of this invention may be represented by the following general formulas:

(a)            $(R_3SiO)_2Ti(OR')_2$
(b)            $(R_3SiO)_3TiOR'$
(c)            $(R_3SiO)Ti(OR')_3$ where R and R' represent alkyl, aryl, aralkyl, alkaryl or mixed alkyl and aryl radicals. Thus R and R' may be methyl, ethyl, propyl, butyl, isopropyl, sec. butyl, and the like; or phenyl, tolyl, naphthyl, diphenyl, ethyl phenyl, etc.; or benzyl, methyl benzyl, α-phenyl ethyl, β-phenyl ethyl, α-phenyl propyl and the like. R' should preferably be an alkyl radical, and especially a lower alkyl radical, such as methyl, ethyl, propyl, isopropyl, butyl, sec. butyl, and the like.

The triorganosubstituted siloxy titanium intermediates (a), (b) and (c) may be prepared by any convenient means provided that substantially pure intermediates (a), (b) and (c) are produced or that a reaction mixture is obtained from which substantially pure intermediates (a), (b) and (c) may be isolated. A satisfactory means is represented by the following reactions and is illustrated in the examples of this invention:

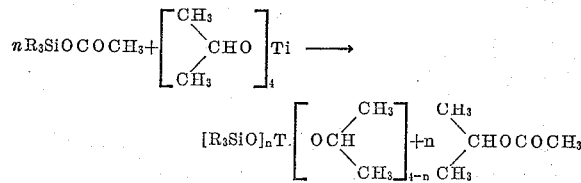

where n is 1, 2, or 3. This reaction is illustrated for a triorganosubstituted acetoxysilane and where R' is an isopropyl radical, but it may be used with other acylates and titanium esters as is known to those skilled in the art. In some cases where the triorganosubstituted silanol is available and stable, the following reaction may be used:

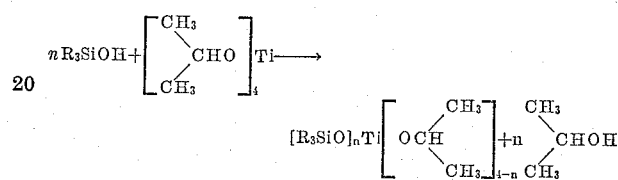

where n is 1, 2, or 3 and the reaction is again illustrated for the case where R' is an isopropyl radical. It is an essential part of this invention that the silane be tri-substituted with substantially no products of lower substitution contaminating the reactants.

With substantially pure intermediate products we have discovered that a variety of useful and unique titanium oxide polymers can be prepared. Three classes of preparative procedures can be used, each yielding the polymers of this invention having broad categories of usefulness. The methods which we have found useful can be illustrated by the following series of reactions:

I.

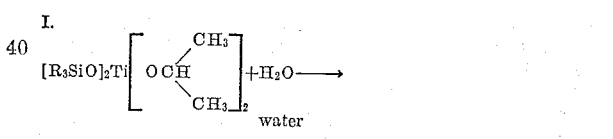

II.

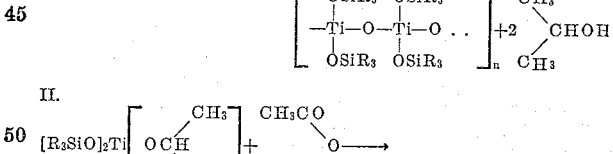

III.

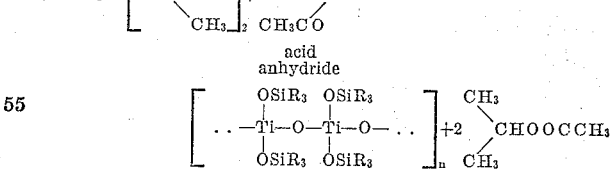

Although these reactions are illustrative of the process of making titanium oxide polymers of this invention, the use of other suitable methods or variations thereof is not precluded. It should be noted that by using method I, polymers are secured containing Ti—OH end groups, whereas those obtained from methods II and III contain

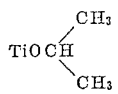

or TiOOCCH₃ end groups, or both, depending upon the stoichiometry of the reaction. In general, polymers prepared by method I, employing water as the reactant, are higher in molecular weight than those from either methods II or III, employing an acid. However, the latter methods yield polymers that may enter into further reaction to modify other resinous materials, yield block and graft polymers or be hydrolyzed to produce high polymers.

Other suitable methods of preparation may be used to produce copolymers of the titanium oxide polymers of this invention. This may be illustrated by reference to method III:

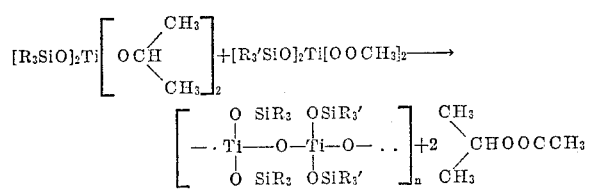

where, for instance, R may be methyl and R' may be phenyl. It may be seen that this method of preparation produces regularly alternating copolymers, whereas the other methods produce random copolymers. The properties of the regularly alternating and the random polymers frequently differ considerably. It should be pointed out that the acylates utilized in method III can be conveniently prepared by reaction of the alcoholates with an excess of the appropriate acid anhydride as illustrated by the following reaction:

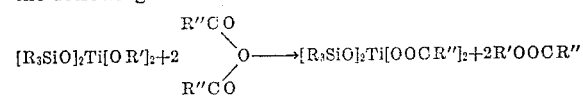

where R'' may be methyl, ethyl, propyl, butyl, phenyl, benzyl and the like.

In method III, a slight excess of the alcoholate over the acylate will result in polymers terminated by alcoholate groups; whereas a slight excess of acylate over the alcoholate will result in acylate groups on the polymer chain ends. By judicious choice of reaction conditions, block copolymers may be prepared by the further reaction of a polymer with acylate chain ends with one having alcoholate chain ends. This may be illustrated by the following reaction:

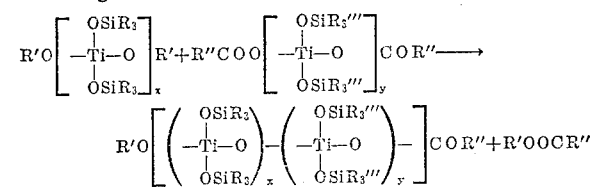

So far, the titanium oxide polymers of this invention have been illustrated with intermediate (a) which is capable of forming linear polymers whose properties range from liquid to thermoplastic solids depending upon the degree of polymerization and upon the character of the triorganosubstituted siloxy side chain. Intermediate (b) may be used with (a) to terminate polymer chain growth to produce substantially permanently fusible linear polymers. Intermediate (c) has a functionality of three and therefore may be used to produce the cross-linked titanium oxide polymers of this invention. These cross-linked polymers may be produced directly by hydrolysis according to method I or they may be produced as fusible polymers by methods II and III and hydrolyzed later to yield cross-linked compositions. The latter compositions range from highly cross-linked solids, useful as laminating, molding, and varnish resins, to lightly cross-linked materials suitable for varnishes, embedding or elastomeric resins.

The polymers of the present invention may be used alone or in a mixture with fillers and reinforcing agents, the proper choice dependent upon the end use of the composition. As fillers there may be used glass fibers, clays, pigments such as iron oxide, zinc oxide, litharge and especially titanium dioxide, etc. Although the compositions of this invention may be advanced or cured by the application of heat, catalysts may be employed such as metallic salts of carboxylic acids, quaternary ammonium salts, metallic oxides, organic peroxides, and the like.

The following examples are given to illustrate the materials of the present invention. These examples are not to be construed as limiting to the spirit and scope of this invention in any manner, but merely as illustrations of the polymer compositions and the processes of making the same.

*Example I*

To one mole of bis-(trimethylsiloxy)-diisopropoxytitanium dissolved in 250 ml. of isopropyl alcohol was added slowly one mole of water. After the exothermic reaction had subsided, the clear solution was heated while stirring for three hours. The isopropyl alcohol was removed first by distillation at atmospheric pressure and then under vacuum. The residual material was a yellow, viscous material which solidified upon standing in air. This high polymer was soluble in such solvents as dimethylformamide, dimethylsulfoxide and the like. It could be heated in film form in the air to effect cure and insolubilization.

*Example II*

An equimolar quantity of acetic anhydride was slowly added to bis-(trimethylsiloxy) diisopropoxytitanium. The reaction was exothermic and an immediate formation of a white precipitate was observed. The amount of solid increased as the acetic anhydride was added. The mixture was stirred for three hours after which the condensation product, isopropyl acetate, was removed by distillation. A tan, powdery solid soluble in toluene and insoluble in petroleum ether was obtained. The resulting resin was useful in coating, laminating and molding applications.

*Example III*

To a mixture of 30.96 grams of bis-(trimethylsiloxy) diisopropoxytitanium and 3.74 grams of tris-(trimethylsiloxy) isopropoxytitanium was added slowly 10.2 grams of acetic anhydride. After the exothermic reaction had subsided, the clear solution was stirred at room temperature for two hours. The condensation product, isopropyl acetate, was first removed by distillation at atmospheric pressure and then under vacuum. The residual product remaining in the flask was a relatively viscous, yellow fluid soluble in aromatic solvents. It possessed excellent thermal stability when heated in an inert atmosphere. In the presence of oxygen and in film form prolonged heating at elevated temperature caused further curing to occur.

*Example IV*

An equimolar quantity of acetic acid was added slowly to bis-(trimethylsiloxy) diisopropoxytitanium. An evolution of a considerable amount of heat was observed. The clear reaction mixture was heated while stirring for one hour. The volatile material was then distilled off, leaving behind a viscous, yellow fluid. Upon further prolonged heating additional polymerization was caused resulting in a hard brittle amber-colored resin of excellent thermal stability.

What is claimed is:

1. A process for the production of triorganosiloxy substituted titanium oxide polymer comprising reacting by organic alcohol or organic ester elimination a triorganosiloxy alkoxy titanium compound having the general formula $(R_3SiO)_nTi(OR')_{-n}$ with a compound selected from the group consisting of water, organic acid anhydride, and triorganosiloxy acyloxy titanium derivative having the general formula $(R''_3SiO)_mTi(OOCR''')_{4-m}$ wherein R and R''' are hydrocarbon radicals selected from the class consisting of alkyl, aryl, aralkyl and alkaryl, wherein R' and R'' are hydrocarbon alkyl radicals and $m$ and $n$ take the integral values of 1 or 2.

2. A process for the production of a triorganosiloxy substituted titanium oxide polymer comprising reacting by organic alcohol or organic ester elimination a triorganosiloxy alkoxy titanium compound having the general formula $(R_3SiO)_nTi(OR')_{4-n}$ with a compound selected from the group consisting of water, organic acid anhydride and triorganosiloxy acyloxy titanium derivative having the general formula $(R''_3SiO)_mTi(OOCR''')_{4-m}$ wherein R and R'' are hydrocarbon alkyl radicals selected from the group consisting of methyl, ethyl, propyl, butyl, aryl and hexyl wherein R' and R''' are hydrocarbon alkyl radicals and $m$ and $n$ take the integral values of 1 or 2.

3. A process for the production of triorganosiloxy substituted titanium oxide polymer comprising reacting by organic alcohol or organic ester elimination a trialkylsiloxy alkoxy titanium compound having the general formula $(R_3SiO)_nTi(OR')_{4-n}$ with a compound selected from the group consisting of water, organic acid anhydride and trialkylsiloxy acyloxy titanium derivative having the general formula $(R_3''SiO)_mTi(OOCR''')_{4-m}$ wherein R and R'' are hydrocarbon alkyl radicals selected from the group consisting of methyl, ethyl, propyl, butyl, aryl and hexyl wherein R' and R''' are hydrocarbon alkyl radicals and $m$ and $n$ take the integral values of 1 or 2.

4. A process according to claim 1 wherein R is a hydrocarbon aryl radical and R'' is a hydrocarbon aryl radical.

5. A process according to claim 1 wherein R is a hydrocarbon aryl radical and R'' is a hydrocarbon alkyl radical.

6. A process according to claim 1 wherein R is a hydrocarbon aryl radical and R'' is a hydrocarbon aralkyl radical.

7. A process according to claim 1 wherein R is a hydrocarbon alkyl radical and R'' is a hydrocarbon alkyl radical.

8. A process according to claim 1 wherein R is a hydrocarbon alkaryl radical and R'' is a hydrocarbon alkyl radical.

9. A process according to claim 1 wherein R is a hydrocarbon aralkyl radical and R'' is a hydrocarbon alkyl radical.

10. A process for the production of an organosiloxy substituted titanium oxide polymer comprising reacting by organic alcohol elimination bis(trimethylsiloxy) diisopropoxy titanium with water.

11. A process for the production of an organosiloxy substituted titanium oxide polymer comprising reacting by organic ester elimination bis(trimethylsiloxy) diisopropoxy titanium with acetic anhydride.

12. A process for the production of an organosiloxy substituted titanium oxide polymer comprising reacting by organic ester elimination a mixture of bis(trimethylsiloxy) diisopropoxy titanium and tri(trimethylsiloxy) isopropoxy titanium with acetic anhydride.

13. A triorganosiloxy titanium oxide polymer comprising the reaction product formed by organic alcohol or organic ester elimination from triorganosiloxy alkoxy titanium compound having the general formula $(R_3SiO)_nTi(OR')_{4-n}$ with a compound selected from the group consisting of water, organic acid anhydride and triorganosiloxy acyloxy titanium derivative having the general formula $(R''_3SiO)_mTi(OOCR''')_{4-m}$ wherein R and R'' are hydrocarbon radicals selected from the group consisting of alkyl, aryl, aralkyl and alkaryl wherein R' and R''' are hydrocarbon alkyl radicals and $m$ and $n$ take the integral values of 1 or 2.

References Cited in the file of this patent

UNITED STATES PATENTS

| | | |
|---|---|---|
| 2,512,058 | Gulledge | June 20, 1950 |
| 2,620,318 | Boyd et al. | Dec. 2, 1952 |
| 2,676,102 | Boyd et al. | Apr. 20, 1954 |

UNITED STATES PATENT OFFICE
CERTIFICATION OF CORRECTION

Patent No. 3,013,993            December 19, 1961

John B. Rust et al.

It is hereby certified that error appears in the above numbered patent requiring correction and that the said Letters Patent should read as corrected below.

Column 2, lines 5 to 9, for that portion of the formula reading "$[R_3SiO]_nT$" read -- $[R_3SiO]_nTi$ --; same column 2, line 45 to 47, the formula should appear as shown below instead of as in the patent:

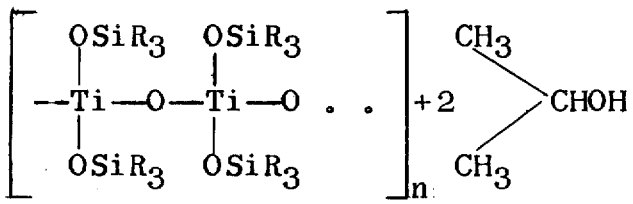

column 3, lines 20 to 24, for that portion of the formula reading "$[OOCH_3]_2$" read -- $[OOCCH_3]_2$ --; same column 3, lines 24 to 27, the formula should appear as shown below instead of as in the patent:

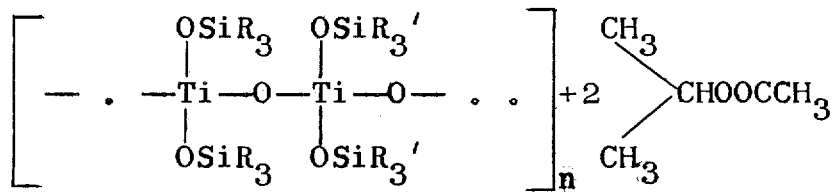

column 5, line 2, for "$(R_3SiO)_nTi(OR')_{-n}$" read -- $(R_3SiO)_nTi(OR')_{4-n}$ --; column 6, line 1, for "alkyl", second occurrence, read -- aralkyl --.

Signed and sealed this 12th day of June 1962.

Attest:

ERNEST W. SWIDER            DAVID L. LADD
Attesting Officer            Commissioner of Patents

UNITED STATES PATENT OFFICE
CERTIFICATE OF CORRECTION

Patent No. 3,013,993                      December 19, 1961

John B. Rust et al.

It is hereby certified that error appears in the above numbered patent requiring correction and that the said Letters Patent should read as corrected below.

Column 5, line 6, for "and $R'''$ are" read -- and $R''$ are --; same column, line 8, for "and $R''$ are" read -- and $R'''$ are --.

Signed and sealed this 4th day of September 1962.

(SEAL)
Attest:

ERNEST W. SWIDER
Attesting Officer

DAVID L. LADD
Commissioner of Patents